United States Patent Office 2,994,193
Patented Aug. 1, 1961

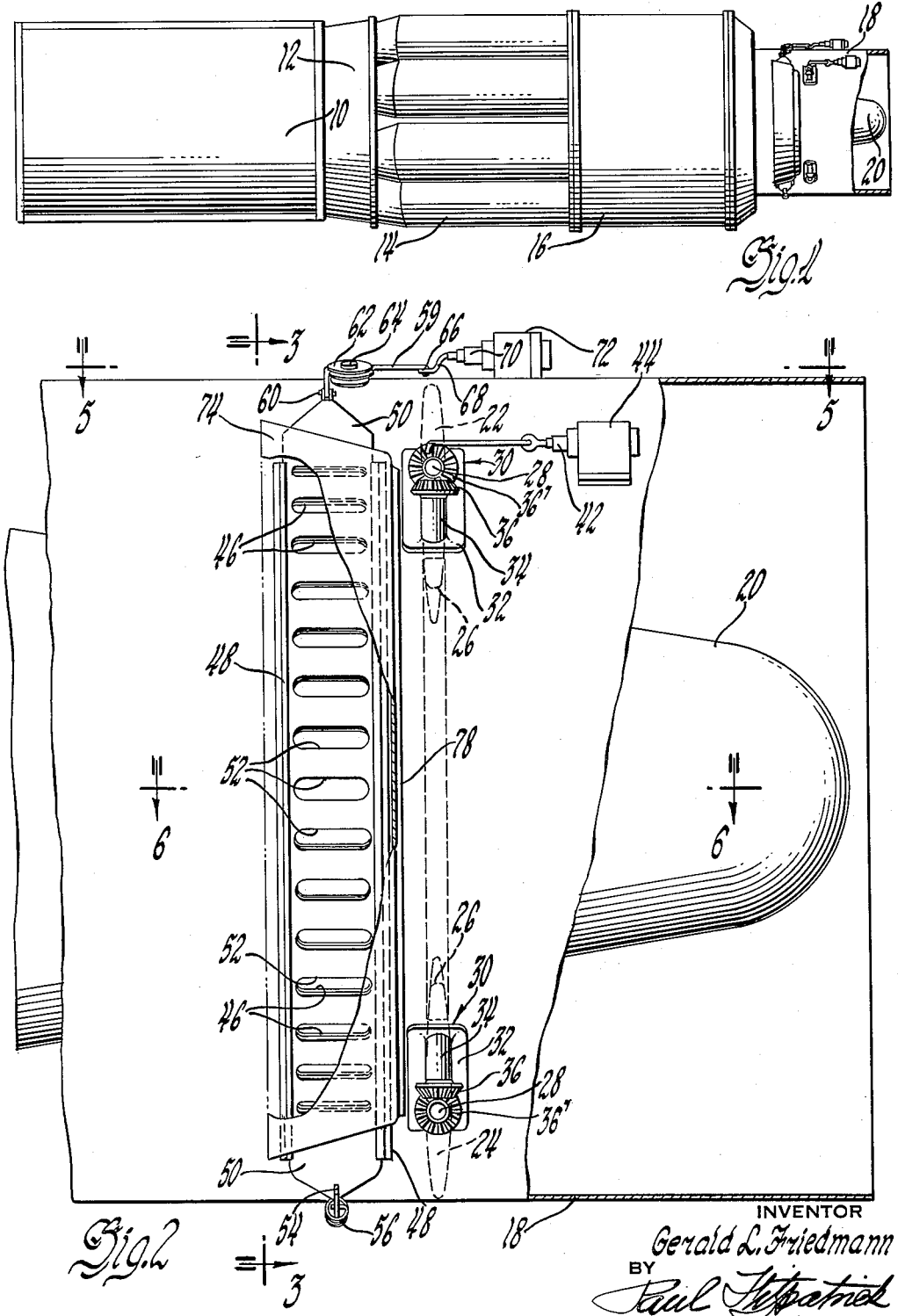

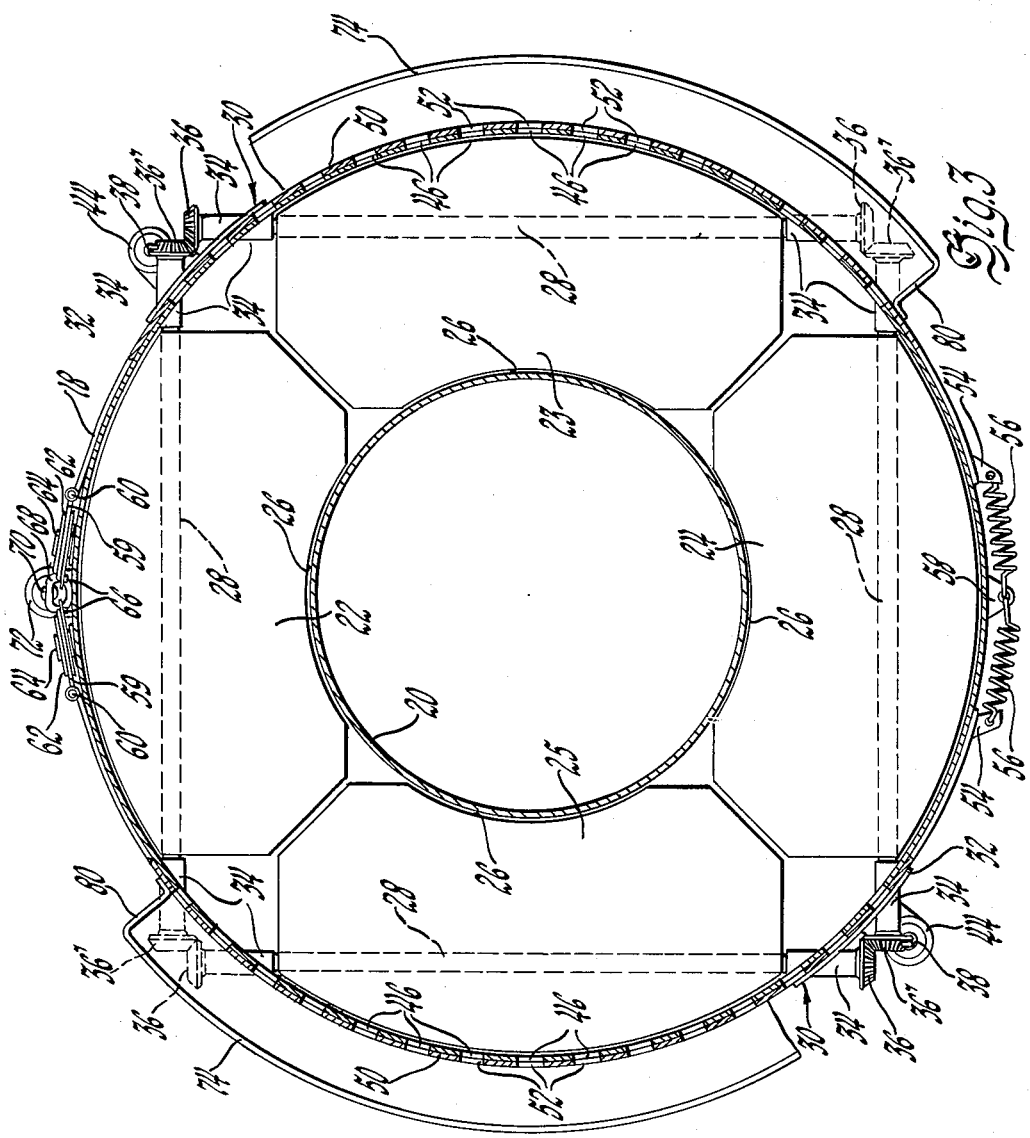

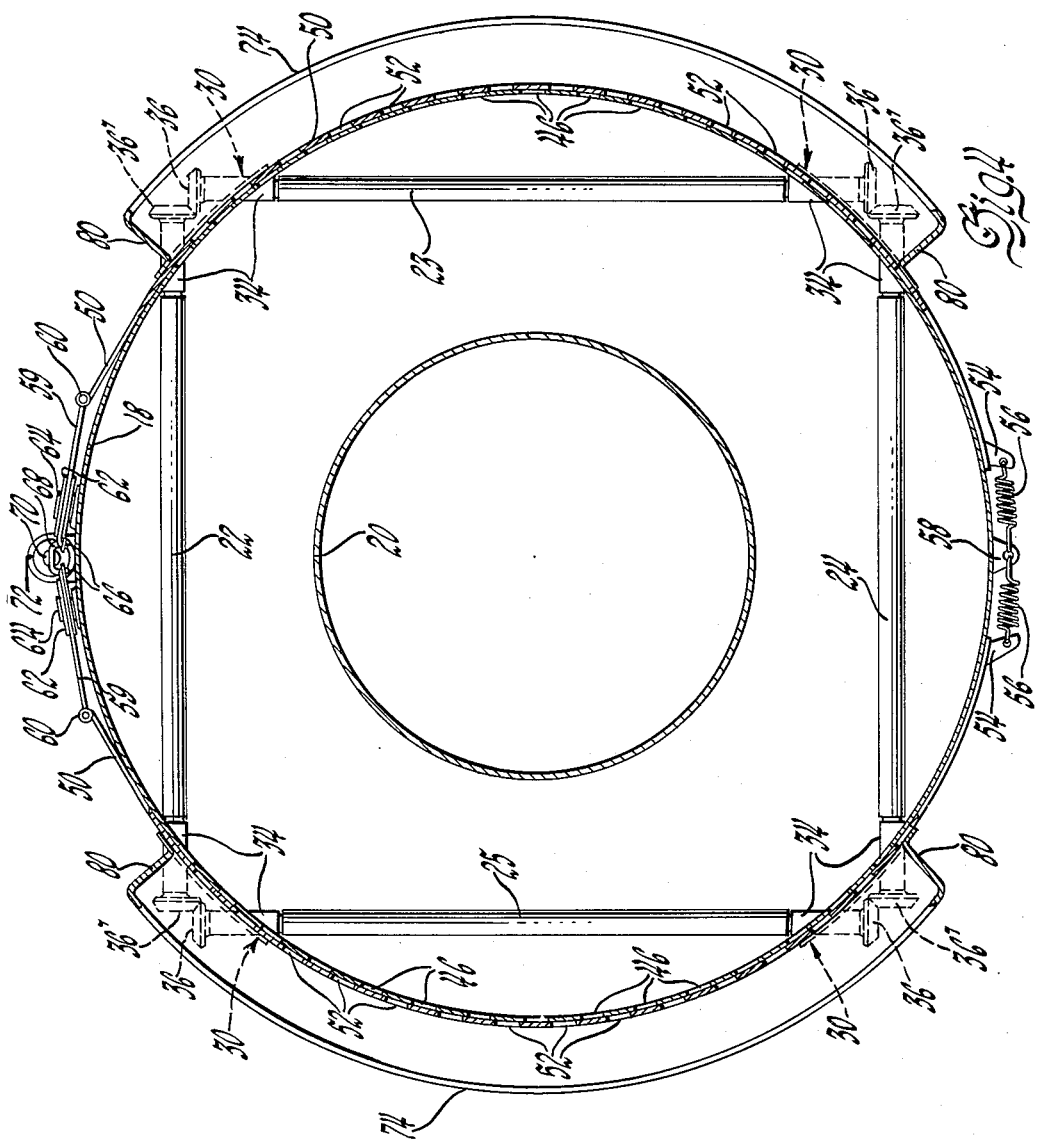

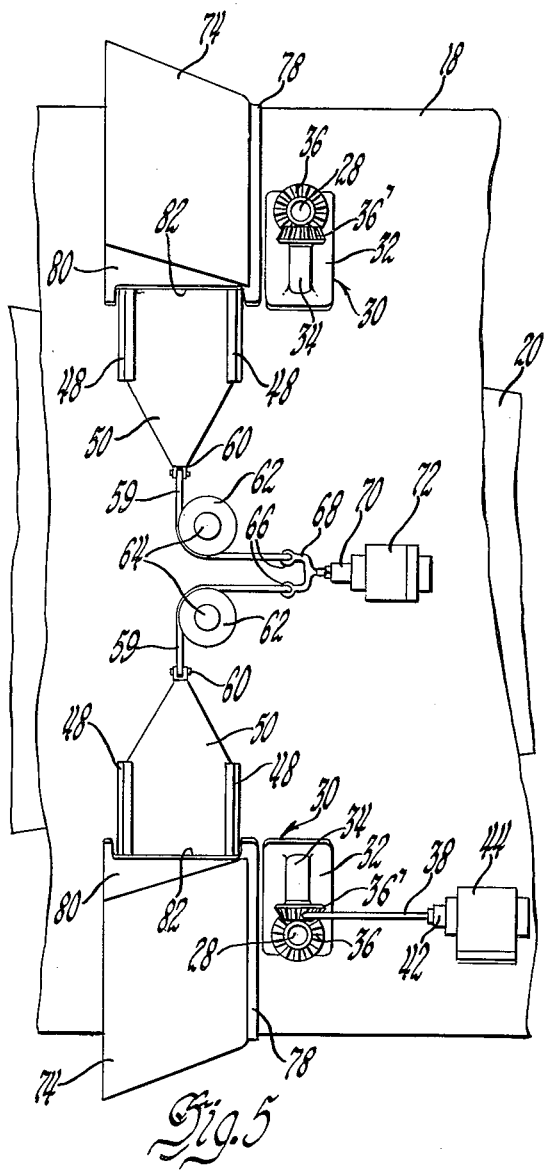
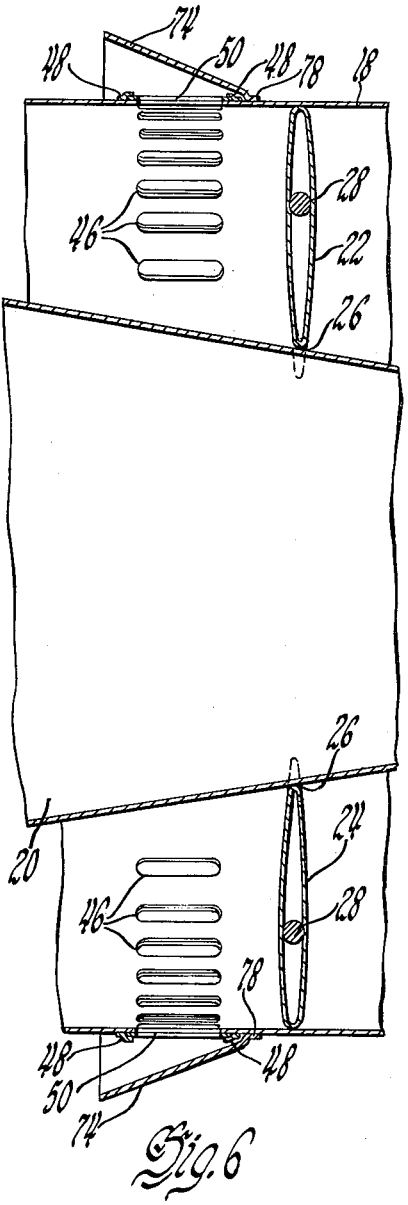
Fig.5
Fig.6

2,994,193
JET THRUST REVERSING MEANS FOR JET ENGINES
Gerald L. Friedmann, Speedway, Ind., assignor to General Motors Corporation, Detroit, Mich., a corporation of Delaware
Filed June 14, 1956, Ser. No. 591,420
2 Claims. (Cl. 60—35.54)

This invention relates to jet thrust reversing means for jet engines and more particularly to jet thrust reversing means to provide a braking effect on an aircraft employing jet engines for forward propulsion.

The jet thrust reversing means of this invention includes both a blockage unit to variably interrupt the rearward flow of propulsive gases through the exhaust nozzle of the engine and also a variable area exit nozzle to divert the flow of propulsive gases forwardly of the engine to impart a reverse thrust to the engine and thereby provide a braking effect on the aircraft. Since both the blockage unit and the exit nozzle are variable the braking effect on the aircraft may be varied within substantial operating limits.

The primary object of this invention is to provide a new and improved jet thrust reversing means for an aircraft propelled by jet engines so as to provide a braking effect to the forward propulsion of the aircraft. Another object of this invention is to provide a new and improved jet thrust reversing means for a jet engine propelled aircraft which includes a variable blockage unit and a variable area exit nozzle which cooperate to provide a variable braking effect on the aircraft.

These and other objects of this invention will be readily apparent from the following specification and drawings, in which:

FIGURE 1 is a view of a turbo jet engine embodying a jet thrust reversing means according to this invention;

FIGURE 2 is an enlarged view of the exhaust nozzle portion of the engine of FIGURE 1, with parts broken away for clarity of illustration;

FIGURE 3 is a view taken on the plane indicated by line 3—3 of FIGURE 2 showing the blockage unit and the exit nozzle in thrust reversing position;

FIGURE 4 is a view similar to FIGURE 3 showing the blockage unit and the exit nozzle in normal engine operating position;

FIGURE 5 is a view taken on the plane indicated by line 5—5 of FIGURE 2; and

FIGURE 6 is a sectional view taken on the plane indicated by line 6—6 of FIGURE 2.

Referring now to FIGURE 1 of the drawings, a turbo jet engine includes a compressor 10 which receives ambient air and discharges the air under pressure through a nozzle 12 to an annular series of combustors 14 wherein fuel is supplied to the air and the mixture ignited to provide propulsive gases, a turbine 16 driven by the gases and driving the compressor 10, and an exhaust nozzle 18 receiving the propulsive gases from the turbine and discharging the gases to the atmosphere to provide a forward propulsive effect to an aircraft employing the engine. The exhaust nozzle 18 is in the form of an annular tube and is provided internally thereof with an outwardly tapered tailcone 20.

In the normal operation of the engine, no barrier is interposed to the rearward efflux of propulsive gases through the exhaust nozzle 18. However, if it is desired to employ the gases in providing a braking effect on the aircraft, some means of interrupting the rearward flow of propulsive gases through the exhaust nozzle and diverting this flow forwardly of the engine must be provided. This invention provides a variable blockage unit to interrupt the rearward flow of propulsive gases through the exhaust nozzle and also provides a variable area exit nozzle to divert the flow of exhaust gases forwardly of the engine to thereby employ the gases in providing a braking effect on the airplane. Thus, the engine can be used for normal forward propulsion of the aircraft and can also be used to provide a braking effect on the aircraft when desired.

Referring now to FIGURES 2, 3, 4, and 6 of the drawings, the blockage unit includes four hollow sheet metal vanes 22, 23, 24, and 25 which are normally positioned parallel to the flow of exhaust gases through nozzle 18, as can be seen in FIGURE 4, but are movable to a position normal to the flow of exhaust gases, as shown in FIGURES 3 and 6, wherein they substantially close the annular space between the tailcone 20 and the exhaust nozzle 18 to interrupt the rearward efflux of propulsive gases from the exhaust nozzle. Each vane is of the air foil cross section, as can be seen in FIGURE 6, and the trailing edge of each vane is arcuately cut out at 26 to fit around the tailcone 20 when the vanes are in blocking position, as shown in FIGURES 3 and 6. Each vane is welded or otherwise secured to a rod 28 which extends through the vane and also outwardly of the exhaust nozzle 18. Adjacent ends of each rod are supported in bearing pads 30 which are secured to the outer surface of the exhaust nozzle at four equally spaced positions. Since each of the bearing pads is of the same construction, only one will be particularly described. Each pad includes an arcuately shaped plate member 32 which is welded or otherwise secured to the outer surface of nozzle 18 and a pair of bearing sleeves 34 located at substantially right angles to each other and extending to either side of nozzle 18 through suitably shaped openings therein to support the ends of rods 28. The plate member 32 and the bearing sleeves 34 are preferably formed as an integral unit, although the sleeves may be formed separately of the plate member and secured thereto in a suitable manner prior to mounting of the bearing pad on the exhaust nozzle.

Each end of each rod 28 is provided with a bevel gear 36, with each pair of adjacent bevel gears meshing with each other. The bevel gears are so arranged that turning of any one of the rods 28 in a particular direction will result in turning of all other rods in the same direction so that each of the blockage flaps will simultaneously move with the other flaps between a normal position, as shown in FIGURE 4, and a blocking position, as shown in FIGURE 3. Since the rods 28 are interconnected by the bevel gears only one bevel gear need be driven in order to operate all of the flaps. However, in order to provide even and steady movement of the flaps between normal position and blocking position and to hold the flaps in blocking position against the thrust of the gears, one bevel gear 36' of two diametrically opposite pairs of meshing bevel gears is driven. A cable 38 is secured at one end thereof to each of the diametrically opposite bevel gears 36' and the other end of the cable is secured to the piston rod 42 of a hydraulic piston and cylinder unit 44. The units 44 are of known construction and are secured in a suitable manner to the outer surface of nozzle 18 rearwardly of the bevel gears.

Each unit 44 is power operated in only one direction so that cables 38 will only be shifted rearwardly of the engine by the power units to move the blockage flaps from their normal position to their blocking position against the thrust of the propulsive gases. Upon release of the hydraulic pressure fluid from the units 44, the flaps will automatically be returned to normal position by the thrust of the exhaust gases against the flaps. The center of pressure of the flaps is positioned inwardly of rods 28, approximately midway between the rods and the arcuate cut out portion 26 of the flaps.

By providing power operation of the flaps from normal position to blocking position and locating the center of pressure of each flap in such a manner that the flap will automatically return to its normal position upon release of the hydraulic pressure fluid, a safety feature is built into the operation of the flaps. If the hydraulic power system of the aircraft fails, the pilot need not worry about return of the flaps to their normal position since the rearward flow of the exhaust gases will automatically return the blockage flaps to their normal position to allow unopposed flow of the exhaust gases outwardly of the exhaust nozzle. This built in safety feature represents a distinct advancement in the use of blockage flaps, since without this feature there would be an increased hazard in a jet engine employing such flaps wherein the flaps would have to be moved between both normal and blocking position by hydraulic or other power units subject to failure.

It is intended that the power units 44 be interconnected by a suitable fluid pressure circuit so as to be simultaneously operated by a control member under the control of the pilot. It should also be noted that the flaps may be moved to any intermediate position between normal and blocking positions so as to variably interrupt the rearward efflux of exhaust gases through nozzle 18. Thus, the position of the flaps will depend on the degree of braking desired.

Referring now particularly to FIGURES 2, 3, 5, and 6, the variable area exit nozzle will be described. The exhaust nozzle 18 is provided with two spaced annular series of slots 46 on either side thereof and forwardly of the blockage flaps. Each slot of each series is equally spaced from the adjacent slot in the series and corresponding slots of each series are diametrically located with respect to each other. The slots may be positioned otherwise if so desired. An angularly shaped guide 48 is secured to the outer surface of nozzle 18 to either end of slots 46. A band 50 provided with a series of slots 52 has opposite edge portions thereof slidably fitting within guides 48 so as to guide the movement of the band between a first position wherein the slots 52 of the band are located between the slots 46 in the exhaust nozzle, as shown in FIGURE 4, and a second position wherein the slots 52 of the band are aligned with slots 46 in the exhaust nozzle, as shown in FIGURES 2 and 3. One pair of adjacent ends of the band mount a laterally outwardly extending bracket 54 which receives one end of a spring 56, with the other end of the spring being secured to a bracket 58 which is mounted on the outer surface of nozzle 18 intermediate the bands.

A cable 59 is secured at 60 to the other end of each band and passes around a pulley 62 rotatably mounted on nozzle 18 at 64. The other end of each cable is secured at 66 to a U-shaped member 68 which in turn is secured to the piston rod 70 of a hydraulic piston and cylinder unit 72 secured to the outer surface of nozzle 18 rearwardly of the bands. An outwardly and forwardly obliquely extending annular shroud 74 is secured to the outer surface of nozzle 18 and covers each annular series of slots 46 in the nozzle. Each shroud includes a rear mounting flange 78 secured to nozzle 18 rearwardly of the rear guide 48 and end walls 80 which are cut away at 82 to provide clearance for the guides 48 and band 50.

The hydraulic piston and cylinder unit 72 is similar to the units 44 in that it is power operated in only one direction to shift cables 59 rearwardly of the exhaust nozzle and move the bands 50 from their first position, as shown in FIGURE 4, wherein the slots 52 of the band are located between the slots 46 in the exhaust nozzle and their second position, as shown in FIGURES 3 and 6, wherein the slots 52 of the band are aligned with the slots 46 in the exhaust nozzle. Upon release of the pressure fluid from within unit 72, springs 56 are automatically operable to return the bands 50 to their first position. By providing the unit 72 which is power operated in only one direction, a desirable safety feature is built into the operation of the variable area exit nozzle. Should the hydraulic power system of the aircraft fail the pilot need not worry about return of the bands to their normal or first position.

It is intended that the unit 72 be interconnected with the hydraulic power system of the aircraft and that a control member be provided in the pilot's compartment to provide for operation of the bands 50 from their first position to their second position. The control member for the bands may be part of a control mechanism which also includes the control member for the blockage flaps or the control members for the bands and the flaps may be independent.

It should be noted that the bands 50 may be moved to any intermediate position between their first position and their second position wherein the slots 52 of the band are in various degrees of alignment with the slots 46 of the nozzle. Thus, the exit nozzle provided by the bands and the openings in the bands and the exhaust nozzle will provide a variable area exit nozzle.

As previously mentioned, the blockage flaps may be moved between normal and blocking position or to any position therebetween. By adjustment of the position of the blockage flaps between their normal and blocking position and the adjustment of the degree of alignment of the slots 52 of the band with slots 46 of the exhaust nozzle, the desired degree of braking effect on the aircraft may be obtained.

Although not shown in the drawings, a nacelle is usually provided around the engine after it has been mounted within the aircraft. Suitable openings are cut in the nacelle in the area of the shrouds 74 to allow the forward discharge of the propulsive gases from the shrouds through the engine nacelle.

Thus, this invention provides an improved jet thrust reversing means to provide a braking effect on an aircraft employing jet engines for forward propulsion. The jet thrust reversing means includes both the blockage unit to variably interrupt the rearward flow of propulsive gases through the exhaust nozzle and also includes the variable area exit nozzle to direct the flow of propulsive gases forwardly of the engine. Both the blockage unit and the exit nozzle have safety features built into the operation thereof to insure that failure of the power operating means for these units will not result in failure of the aircraft. Both units are variable within substantially wide operating limits to provide a variable braking effect on the aircraft as desired by the pilot.

I claim:

1. In a jet engine, an exhaust nozzle, a multiplicity of circumferentially spaced gas discharge openings in said exhaust nozzle, a band slidably mounted for circumferential movement on said nozzle adjacent to said openings, said band having a multiplicity of circumferentially spaced gas discharge openings therein, said band being movable between a first position wherein said gas discharge openings therein are intermediate the gas discharge openings in said nozzle and a second position wherein said gas discharge openings therein are positioned in some degree of alignment with said gas discharge openings in said nozzle, resilient means operatively connected to said band to bias said band to said first position thereof, power actuating means for moving said band from said first position thereof to said second position thereof, said power actuating means comprising a power operated axially movable member located on the exterior of said nozzle, an idler pulley located adjacent one end of said band and a flexible cable wrapped on said pulley and connecting the other band end and said axially movable member, whereby when said axially movable member is power operated the cable will move said band against the force of said resilient means from said first position to said second position, said resilient means automatically returning said band to said first position thereof upon release of said power operated means, an annular shroud member mounted on said exhaust nozzle over said band openings for diverting the flow of gases through said nozzle and band openings forwardly of said nozzle, and controllable blocking means in said nozzle rearwardly of said gas discharge openings therein.

2. In an aircraft having a jet engine and an exhaust nozzle forwardly receiving propulsive gases and rearwardly discharging the gases to the atmosphere to provide forward propulsion of the aircraft, the combination comprising, a multiplicity of circumferentially spaced gas discharge openings in said exhaust nozzle, a band slidably mounted for circumferential movement on said nozzle adjacent to said openings, said band having a multiplicity of circumferentially spaced gas discharge openings therein, said band being movable between a first position wherein said gas discharge openings therein are intermediate the gas discharge openings in said nozzle and a second position wherein said gas discharge openings therein are positioned in some degree of alignment with said gas discharge openings in said nozzle, resilient means operatively connected to one end of said band to bias said band to said first position thereof, power actuating means for moving said band from said first position thereof to said second position thereof, said power actuating means comprising a power operated axially movable member located on the exterior of said nozzle, an idler pulley located adjacent the other end of said band and a flexible cable wrapped on said pulley and connecting said other band end and said axially movable member, whereby when said axially movable member is power operated the cable will move said band against the force of said resilient means from said first position to said second position, said resilient means automatically returning said band to said first position thereof upon release of said power operated means, an annular shroud member mounted on said exhaust nozzle over said band openings for diverting the flow of gases through said nozzle and band openings forwardly of said nozzle, a plurality of circumferentially arranged blockage flaps pivotally supported by and within said nozzle rearwardly of said gas discharge openings therein, means connected to said flaps for pivoting the same between a first position where said flaps allow the rearward efflux of said propulsive gases and a second position where said flaps cooperate to block the rearward efflux of said gases and thereby divert said gases through said nozzle and band openings to provide a braking effect on said aircraft.

References Cited in the file of this patent

UNITED STATES PATENTS

| | | |
|---|---|---|
| 138,580 | Pigot | May 6, 1873 |
| 844,332 | Demacakos | Feb. 19, 1907 |
| 2,620,622 | Lundberg | Dec. 9, 1952 |
| 2,681,548 | Kappus | June 22, 1954 |
| 2,729,937 | Hausmann | Jan. 10, 1956 |
| 2,865,169 | Hausmann | Dec. 23, 1958 |

FOREIGN PATENTS

| | | |
|---|---|---|
| 161,948 | Australia | Mar. 15, 1955 |
| 162,754 | Australia | May 9, 1955 |
| 1,066,499 | France | June 8, 1954 |
| 860,754 | Germany | Dec. 22, 1952 |
| 654,344 | Great Britain | June 13, 1951 |
| 740,385 | Great Britain | Nov. 9, 1955 |
| 745,720 | Great Britain | Feb. 29, 1956 |